3,140,176
ART OF MAKING COLOR-PHOSPHOR SCREENS OF THE MOSAIC VARIETY
Robert E. Hoffman, Ephrata, Pa., assignor to Radio Corporation of America, a corporation of Delaware
No Drawing. Filed Apr. 12, 1961, Ser. No. 102,393
9 Claims. (Cl. 96—35)

This invention relates to improvements in what is now generally known as the direct photographic method of laying down a mosaic of color-phosphors on a glass substrate for use as the electron-sensitive screen of a color-kinescope.

The direct photographic method of making color-phosphor screens of various dot-like and line-like mosaic varieties consists essentially of the following steps:

(i) Applying to the target surface of a glass screen-plate a slurry layer comprising phosphor particles of one color contained in a photosensitized organic gel, e.g., dichromated polyvinyl alcohol;

(ii) Drying the slurry layer;

(iii) Exposing said phosphor-containing photosensitized layer to actinic rays through the apertures in a suitable optical stencil or mask whereby photographically to record the pattern of dots (or lines) of said one color upon said target surface;

(iv) Washing the plate to develop the photograph thereon;

(v) Drying the phosphor-containing photograph;

(vi) Repeating the preceding steps for each of the other colors, with the source of actinic rays disposed at an appropriately different position with respect to said stencil; and, finally (vii) Baking-out the screen to volatilize and remove the light-hardened polyvinyl alcohol or other organic gel therefrom.

Color-phosphor screens made by the above described method sometimes exhibit a noticeable degree of color contamination which, from its hue, results from the adherence of some of the phosphor particles in a later applied coating to the underlying photographically developed color-phosphor areas of a formerly applied color. This problem has long been recognized and it has previously been proposed to make the different color-phosphors of different average particle size and to lay down the different phosphors in the rising order of their particle size so that the particles of the larger sizes cannot become wedged between the earlier applied smaller size particles.

The principal object of the present invention is to provide an improved photographic method of making color-phosphor screens and one which shall provide a color-screen characterized by its substantial freedom from color-contamination, and this, too, irrespective of the relative particle sizes of the different color-phosphors.

Stated generally, the foregoing and related objects are achieved in accordance with the invention by maintaining the phosphor-containing bodies or coatings, or some of them, moist, and hence swollen, until the otherwise finished screen is baked-out. This is accomplished (a) by the use both before and after development, but prior to "bake-out," of drying temperatures substantially no higher than 30° C. and (b) by the addition to at least the last-applied phosphor slurry of a humectant to which the phosphor particles per se are immune but which is capable of wetting and swelling the organic gel in any previously developed phosphor-containing elementary areas of the mosaic. Having regard both to considerations of cost and of compatability with the phosphor and other ingredients of the slurry the humectant is preferably selected from the class consisting of glycols and glycerol, in which case the amount of humectant is from 30% to 50% by weight of the solid constituent of the organic gel present in the slurry in which the humectant is contained.

Without limiting the invention to any particular theory of operation it may be well here to set forth the following observations as to the mechanics of color-contamination and, also, putative reasons as to how the present invention solves that problem. In the prior art:

(a) The usual light-hardened phosphor-containing screen areas are porous and, viewed in cross-section, exhibit an irregularly serrated profile.

(b) When a second photosensitized serving of slurry is poured over the previously developed phosphor-covered areas, as is the case in laying down a mosaic of two or more color-phosphors, the fluid slurry fills at least some of the crevices or serrations in the underlying light-hardened areas. When the second layer or coating is dried at the relatively high temperature (e.g., 35° C.–40° C.) dictated by the prior art, complete desiccation or parching and consequent shrinkage takes place so that some of the phosphor particles of the second coating are urged into and become entrapped in the crevices of the previously parched first layer or substrate.

(c) The water spray used in the photographic development of the light-hardened coating(s) may also contribute to color contamination. The parched or desiccated phosphor-containing gels of the prior art are slow to re-wet and re-suspend the phosphor particles of the unexposed areas. The poorly suspended particles which are slowly driven out from the unexposed areas of the second coating, by the spray, are at liberty to go anywhere, and some of them find their way into the deep crevices of the previously developed areas of the mosaic. Those second-color particles which were previously entrapped are very difficult to remove because water is a medium of low viscosity and said particles, even if loosely entrapped, can be but poorly suspended in water, and hence are not easily washed away. When, as taught by the present invention, the phosphor slurry formulation is modified by the addition thereto of from 30% to 50% of a humectant (based on the amount of organic solids present), and when the slurry coating or coatings are dried without applied heat, e.g., by whirling at a room temperature substantially no higher than 30° C., what apparently takes place is:

(1) The coating retains a considerable amount of the humectant and, probably, considerably more water than a coating dried at high heat. Complete desiccation of the slurry coating does not occur, at least prior to bake-out.

(2) When the slurry that contains the second color-phosphor is applied over the previously developed first-color pattern, the light-hardened gel in said first-color pattern is re-wetted and re-swelled and apparently becomes as fully plasticized as the second coating.

(3) Since the mild drying temperatures leave both the gel in the photographically developed first pattern and the gel in the undeveloped second coating partially swollen with the humectant and water, there is substantially no chance that the color-phosphor particles in the undeveloped second coating will be pressed into the underlying pattern as they could be if the second coating were subjected to shrinkage by conventional high-temperature drying.

(4) Upon development of a later coating with water-spray, the gel in said coating being loaded with the highly hygroscopic humectant, takes up water very rapidly. As a consequence, (a) the gel in the unexposed areas of the last-applied coating quickly re-dissolves and re-suspends its phosphor. (b) the gel in the underlying developed pattern or patterns re-swells and closes the crevices therein. (c) The phosphor particles from the unexposed areas of the last-applied coating, being resuspended in the viscous gel cannot descend into the reswollen underlying phosphor-gel pattern or patterns and are easily and rapidly removed by the action of the water-spray.

In applying the invention to the manufacture of a 3-color screen, optimum freedom from color-contamination is ensured when the humectant is added to each of the three color-phosphor slurries. The addition of a humectant to all three slurries, however, is not always necessary since, as brought out in the paragraph numbered "2," supra, a slurry containing the specified quantity of a humectant will, when applied over a previously developed "dry" (but unparched or non-desiccated) phosphor pattern, re-wet and re-swell the organic gel in said pattern.

One satisfactory formulation employed in the practice of the invention is:

Phosphor=275 gms. phosphor particles.
Organic gel=550 gms. polyvinyl alcohol solution (10% PVA by weight).
Humectant=22 gms. ethylene glycol.
Photosensitizer=55 gms. ammonium dichromate.
Carrier=375 gms. demineralized water.

Having regard to the color-response characteristic desired in the finished screen, the particular phosphor employed in any slurry may be of any known variety, e.g., sulfide, selenide, silicate, or the like. Albumen, fish glue or the like may be used, instead of polyvinyl alcohol, as the organic gel. Other glycols (e.g., polyethylene glycol) or glycerol may be used in place of ethylene glycol as the humectant in the above formula. Similarly, potassium dichromate, or other suitable photosensitizing substance can be used in place of the specified ammonium dichromate. As to the percentage of humectant employed in the practice of the invention, it has been found that the use of substantially less than 30% may result in failure satisfactorily to re-wet and swell the organic gel in the previously dried mosaic pattern, or patterns. The use of substantially more than 50% of humectant is uneconomical, since it unduly prolongs the drying time.

What is claimed is:
1. In that method of making a color-phosphor screen of the mosaic variety which consists essentially of the following steps:
   (i) applying to a foundation surface a slurry layer comprising phosphor particles of one color contained in a photosensitized organic gel,
   (ii) drying said layer selected from the group consisting of polyvinyl alcohol, fish glue, and albumen,
   (iii) exposing said phosphor-containing photosensitive layer to actinic rays through an optical stencil containing a pattern of transparent areas corresponding to the elementary areas of a single color in the desired mosaic, whereby photographically to record the pattern of elementary areas of that color upon said foundation surface,
   (iv) washing said surface to develop the photograph thereon,
   (v) drying said phosphor-containing photograph,
   (vi) repeating the preceding steps for each of the other colors with the source of actinic rays disposed at appropriately different positions with respect to said stencil,
the improvement in said method which comprises: the use in at least one of the other color slurry layers of a material selected from the group consisting of glycerol and glycols, and the drying of said one of the other color slurry layers without parching it, whereby to minimize intermingling of the color-phosphor in said last applied slurry-layer with the color-phosphor contained in any of said previously developed elementary mosaic areas.

2. The invention as set forth in claim 1 and wherein the drying of said slurry layers and of said phosphor-containing photographs is conducted at a temperature substantially no higher than 30° C.

3. The invention as set forth in claim 1 wherein the amount of said material present is from 30% to 50% by weight of the solid constituent of the organic gel present in the slurry in which said material is contained.

4. The invention as set forth in claim 1 and wherein said organic gel is polyvinyl alcohol and said material is ethylene glycol.

5. Method of making a color-phosphor screen of the mosaic variety, said method comprising: applying to a foundation surface a slurry layer comprising phosphor particles of one color contained in an aqueous solution of photosensitized polyvinyl alcohol; drying said layer at a temperature substantially no higher than 30° C., exposing said phosphor-containing photosensitive layer to actinic rays through an optical stencil containing a pattern of transparent areas corresponding to the elementary areas of a single color in the desired mosaic whereby photographically to record the pattern of elementary areas of that color upon said foundation surface; washing said surface to develop the photograph thereon; drying said phosphor-containing photograph at a temperature substantially no higher than 30° C., applying to said photograph a slurry layer comprising phosphor particles of another color, photosensitized polyvinyl alcohol, and ethylene glycol; drying said second mentioned slurry layer at a temperature substantially no higher than 30° C., exposing said second-mentioned phosphor-containing photosensitive layer to actinic rays through said optical stencil with the stencil disposed at an appropriately different position with respect to the source of said rays whereby photographically to record the pattern of elementary areas of said another color upon said foundation surface, washing said surface to develop said second mentioned photograph and thereafter drying said phosphor-containing photographs.

6. The method of making a mosaic-type color phosphor screen comprising the steps of applying to a foundation surface a layer of slurry including particles of a first phosphor and photosensitized polyvinyl alcohol; exposing the first phosphor layer to a pattern of actinic light; developing the exposed first phosphor layer to remove the unexposed portions thereof from said foundation surface thereby to produce a pattern of first phosphor bodies on said foundation surface; applying to said foundation surface and over said first phosphor bodies a layer of slurry including particles of a second phosphor, photosensitized polyvinyl alcohol, and ethylene glycol; exposing the second phosphor layer to a pattern of actinic light; and developing the exposed second phosphor layer to remove the unexposed portions thereof from said foundation surface and thereby provide a pattern of second phosphor bodies on said foundation surface.

7. The method of making a mosaic-type color phosphor screen comprising the steps of:
   (a) applying to a foundation surface a layer of slurry including particles of a first phosphor and a photosensitized organic gel selected from the group consisting of polyvinyl alcohol, fish glue, and albumen,
   (b) drying the first phosphor layer,
   (c) exposing the dried first phosphor layer to a pattern of actinic light,
   (d) developing the exposed first phosphor layer to remove the unexposed portions thereof from said foundation surface and leave a pattern of first phosphor bodies on said foundation surface,
   (e) drying said first phosphor bodies,
   (f) applying over said foundation surface and said first phosphor bodies a slurry layer comprising particles of a second phosphor, an aqueous solution of a photosensitized organic gel selected from said above-named group, and a glycol selected from the group consisting of ethylene glycol and polyethylene glycol, whereby to minimize intermingling of second phosphor particles from the second phosphor slurry with said first phosphor bodies, (g) drying said second phosphor slurry layer, (h) exposing said second phosphor slurry layer to a pattern of actinic light, (i) developing the exposed second phosphor slurry layer to remove the unexposed portions thereof and leave a pattern of second phosphor bodies on said foundation plate, and (j) drying the phosphor bodies on said foundation surface.

8. The method according to claim 7 and wherein said organic gel is polyvinyl alcohol, said glycol is ethylene glycol, and the drying of said slurry layers and of said first phosphor bodies is conducted at a temperature which is not substantially higher than 30° C. so as to avoid parching them.

9. The method of making a mosaic-type color phosphor screen comprising the steps of applying to a foundatain surface a first layer of slurry including particles of a first phosphor and photosensitized polyvinyl alcohol; drying said first layer without parching it; exposing the dried first layer to a pattern of actinic light; developing the exposed first layer to remove the unexposed portions thereof from said foundation surface thereby to produce a pattern of first phosphor bodies on said foundation surface; applying to said foundation surface and over said first phosphor bodies a second layer of slurry including particles of a second phosphor, photosensitized polyvinyl alcohol, and ethylene glycol; drying said second layer without parching it; exposing the dried second layer to a pattern of actinic light; and developing the exposed second layer to remove the unexposed portions thereof from said foundation surface and thereby provide a pattern of second phosphor bodies on said foundation surface.

References Cited in the file of this patent

UNITED STATES PATENTS

| | | |
|---|---|---|
| 2,897,089 | Ahlburg et al. | July 28, 1959 |
| 2,903,377 | Saulnier | Sept. 8, 1959 |
| 2,929,708 | Straw | Mar. 22, 1960 |
| 3,065,160 | Levinos | Nov. 20, 1962 |

FOREIGN PATENTS

| | | |
|---|---|---|
| 713,908 | Great Britain | Aug. 18, 1954 |